United States Patent
Yin

(10) Patent No.: US 11,789,707 B2
(45) Date of Patent: Oct. 17, 2023

(54) TOOL FOR CREATING FORMS IN WEBPAGE

(71) Applicant: Yulin Yin, Minneapolis, MN (US)

(72) Inventor: Yulin Yin, Minneapolis, MN (US)

(*) Notice: Subject to any disclaimer, the term of this patent is extended or adjusted under 35 U.S.C. 154(b) by 92 days.

(21) Appl. No.: 17/574,675

(22) Filed: Jan. 13, 2022

(65) Prior Publication Data

US 2022/0222048 A1 Jul. 14, 2022

Related U.S. Application Data

(60) Provisional application No. 63/136,770, filed on Jan. 13, 2021.

(51) Int. Cl.

| | | |
|---|---|---|
| *G06F 8/34* | (2018.01) | |
| *G06F 8/38* | (2018.01) | |
| *G06F 9/445* | (2018.01) | |
| *G06F 8/30* | (2018.01) | |
| *G06F 40/106* | (2020.01) | |
| *G06F 9/455* | (2018.01) | |
| *G06F 9/451* | (2018.01) | |

(52) U.S. Cl.
CPC ............... *G06F 8/38* (2013.01); *G06F 8/315* (2013.01); *G06F 8/34* (2013.01); *G06F 9/44505* (2013.01); *G06F 40/106* (2020.01); *G06F 8/313* (2013.01); *G06F 9/451* (2018.02); *G06F 9/45529* (2013.01)

(58) Field of Classification Search
CPC ... G06F 8/34; G06F 8/315; G06F 8/38; G06F 40/106; G06F 9/44505; G06F 9/45529; G06F 9/451
See application file for complete search history.

(56) References Cited

U.S. PATENT DOCUMENTS

| | | | |
|---|---|---|---|
| 2002/0101448 A1* | 8/2002 | Sanderson | G06F 8/38 715/762 |
| 2018/0307465 A1* | 10/2018 | He | G06F 9/451 |
| 2020/0201497 A1* | 6/2020 | Highman | G06F 9/45529 |

OTHER PUBLICATIONS

Hu et al, CN 111782314, (translation) Oct. 16, 2020, 30 pgs <CN_111782314.pdf>.*
Guo, Feng-mian, CN 107526755, (translation) Nov. 3, 2020, 21 pgs <CN_107526755.pdf>.*

* cited by examiner

*Primary Examiner* — Tuan A Vu
(74) *Attorney, Agent, or Firm* — Fredrikson & Byron, P.A.

(57) ABSTRACT

The disclosure is directed to techniques for generating forms on a webpage. Within source code of a webpage, a script file is included that creates a form object class that can be inserted into the source code of the webpage. A device creates a first configuration file that defines a first plurality of components of a first form, including at least one input component and at least one submission component. The device instantiates, within the source code of the webpage, the form object class to create a first instance that includes a reference to the first configuration file. The device executes the source code by executing the script file, executing the first instance using the script file and the first configuration file to generate a graphical user interface that includes at least a portion of the first plurality of components of the first form.

20 Claims, 3 Drawing Sheets

TOOL FOR CREATING FORMS IN WEBPAGE

PRIORITY INFORMATION

This application claims priority to U.S. Provisional Patent Application No. 63/136,770, filed Jan. 13, 2021, the entire contents of which are incorporated herein.

TECHNICAL FIELD

The disclosure relates to webpage creation tools.

BACKGROUND

In general, coding a website requires extensive knowledge in website design and the particular coding language used for the particular website, and requires a large amount of time to perfect. In many business situations, adjustments to websites are needed often, including adjustments to various forms that may be included in the website. This means that an experienced coder must always be available to a company in order to ensure that changes are made in a timely fashion, that the changes are accurate, that the changes do not alter other portions of the website that are intended to remain static, and that the changes do not harm the visual design of the website. Hiring a full-time website designer can be prohibitively expensive for smaller businesses, and websites for larger businesses can include so many elements that even expert coders can be lost in the code.

SUMMARY

In general, the disclosure is directed to a method for utilizing a form creation program within a website source code to easily and consistently create forms within a web page. In the actual source code of a web page, the coder only includes an instantiation call to create a special form object, with the instantiation referencing a separate file of text that includes the code for the form itself. The user may then create the form using specialized code within the separate file, with the code being more intuitive than many similar constructs in other coding languages, such as Hypertext Markup Language (HTML). If edits need to be made to the form, the user need not change the source code of the web page. Rather, the user can simply access the text file to make any needed alterations to the form, providing a more efficient and simpler interface for running a web page that includes one or more forms.

Rather than traditional coding mechanisms, the techniques described herein quickly deploy simple forms without needing business logic. These forms can be embedded in any web site/web page, and require no code for new data/document types. The techniques described herein may work with current applications and are not intrusive to existing business processes (e.g., work with existing applications/portals). The techniques described herein provide forms that can be easily managed, can be customized, provide a consistent look to the user interface (UI), and are accessible. These techniques conform to standards, may be vendor agnostic, may be expressive, and work with existing technology stacks.

In one example, the disclosure is directed to a method comprising including, within source code of a webpage, a script file, wherein the script file creates a form object class that can be inserted into the source code of the webpage. The method further includes creating a first configuration file that defines a first plurality of components of a first form, the first plurality of components including at least one input component and at least one submission component. The method also includes instantiating, within the source code of the webpage, the form object class to create a first instance of the form object class, wherein the first instance includes a reference to the first configuration file. The method further includes executing, using one or more processors, the source code, wherein executing the source code comprises executing the script file, executing the first instance of the form object class using the script file and the first configuration file to generate a graphical user interface that includes at least a portion of the first plurality of components of the first form, and outputting, for display on a display device, the graphical user interface.

In another example, the disclosure is directed to a comprising one or more storage components configured to store source code of a webpage, wherein the source code of the webpage includes a script file, wherein the script file creates a form object class that can be inserted into the source code of the webpage. The computing device also includes one or more processors configured to create a first configuration file that defines a first plurality of components of a first form, the first plurality of components including at least one input component and at least one submission component. The one or more processors are further configured to instantiate, within the source code of the webpage, the form object class to create a first instance of the form object class, wherein the first instance includes a reference to the first configuration file. The one or more processors are also configured to execute the source code by executing the script file, executing the first instance of the form object class using the script file and the first configuration file to generate a graphical user interface that includes at least a portion of the first plurality of components of the first form, and outputting, for display on a display device, the graphical user interface.

In another example, the disclosure is directed to a non-transitory computer-readable storage medium containing instructions. The instructions, when executed, cause one or more processors to create a first configuration file that defines a first plurality of components of a first form, the first plurality of components including at least one input component and at least one submission component. The instructions further cause the one or more processors to instantiate, within source code of a webpage, a form object class to create a first instance of the form object class, wherein the first instance includes a reference to the first configuration file, wherein the source code of the webpage includes a script file, wherein the script file creates the form object class that can be inserted into the source code of the webpage. The instructions also cause the one or more processors to execute the source code by executing the script file. executing the first instance of the form object class using the script file and the first configuration file to generate a graphical user interface that includes at least a portion of the first plurality of components of the first form, and outputting, for display on a display device, the graphical user interface.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Figure 1:
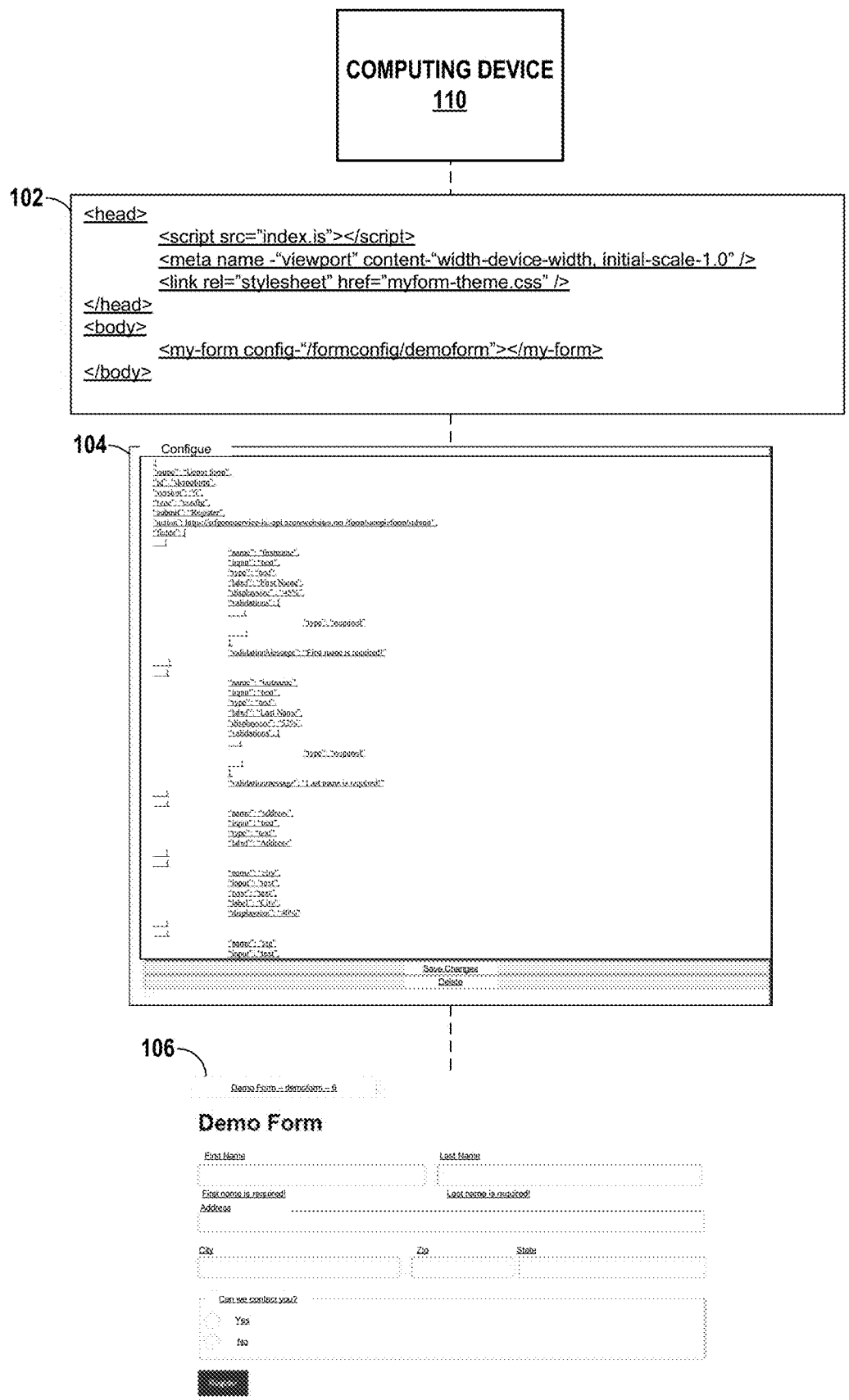
FIG. 1 is a block diagram illustrating an example system configured to perform the creation process for one or more forms in accordance with the techniques described herein.

FIG. 1 is a block diagram illustrating an example system configured to perform the creation process for one or more forms in accordance with the techniques described herein. For instance, computing device 110 may execute source code 102, which accesses configuration file 104, in order to create form 106 in a graphical user interface when accessing a web page.

In some instances, the techniques described herein may be a W3C custom component specification and may be implemented in ES6 and HTML5. There may be a polymer lit-element, and the resulting forms may be themed. Computing device 110 may access configuration file 104 using any of a number of scripting languages, including the standard Javascript application programming interface (API), the Fetch API, or Formdata. In some instances, Javascript Object Notation (JSON) configuration may drive the rendering of the form. The forms may include declarative validations and control logic for form elements (e.g. only show form element when another element has certain value. etc.). These forms may also be supported via polyfill.

The techniques described herein may include a form repository. The form configuration may include rendering and processing information. The rendering configuration may control how the form is ultimately rendered in a web browser. The processing configuration may control how form data is processed. The form data may be stored in a database, such as cosmos database table API and MongoDB. File uploads may be stored in blob storage.

The techniques described herein may be flexible by accepting any data submitted using FormData API or application/x-www-form-url encoded header (forms created using a different tool can submit data to this service). The techniques described herein may be accessible through an API, utilize form processing, provide a serverless function, and process data as they come in according to processing instructions defined for the form. Example processing configurations include sending the data to another application via an API, data transformation such as projection or generating a PDF, do nothing, email the data, save the data to another database, etc.

In one example, configuration file 104 may have a standard JSON document format. Configuration file 104 may contain everything the form client needs to render a form. Configuration file 104 includes language that is expressive and easy to understand. To use the form client, no programming skills are needed. Users only need to create configuration file 104 to use the form in a web page.

Configuration file 104 can be created using any text editor or generated by a program. Data can be submitted to a form repository or another service.

Form 106 is a sample form developed using the tool and configuration file 104. Form 106 supports a complex layout (vertical and horizontal), field validations, help texts, and adaptive logic (hide or display fields depending on user input). Form 106 can also display multi-lingual language and is optimized for web accessibility.

Only two HTML elements (i.e., a script call and a form instantiation) may be required in source code 102 to include form 106 inside any web page. The details of form 106 are included in configuration file 104. Configuration file 104 can be stored locally on users devices, as a static file on a website, or served dynamically from a server. Configuration file 104 may be in standard JSON format, basically as a collection of name/value pairs.

Form authors are responsible to describe the form in this format, not to implement the form. The descriptions include title and the detail of the fields, help text, validations (if desired), and adaptive logic (if any). Since configuration file 104 is a text based file, no additional knowledge (e.g., HTML, CSS, Javascript, etc.) or tools (e.g., Visual studio Code, etc.) are required to develop a web form.

For form authoring and management, the forms created using the techniques described herein may be designed to be used inside a web browser (including computer, tablet, and smart phone). In such instances, only a browser may be needed to author and manage the forms. Configuration file 104 may be accessed through a text editor in the web browser. In some instances, a preview of form 106 may be displayed in real time when editing configuration file 104. When the user completes the editing, form 106 and configuration file 104 may be saved and published with a click of a button. No additional tools may be needed.

Rather than traditional coding mechanisms, the techniques described herein quickly deploy simple forms without needing business logic. These forms can be embedded in any web site/web page, and require no code for new data/ document types. The techniques described herein may work with current applications and are not intrusive to existing business processes (e.g., work with existing applications/ portals). The techniques described herein provide forms that can be easily managed, can be customized, provide a consistent look to the user interface (UI), and are accessible. These techniques conform to standards, may be vendor agnostic, may be expressive, and work with existing technology stacks. The source code decreases in size, freeing up additional space in memory and decreasing the processing of the source code itself when executing the source code. This also increases the security of the source code itself, as users need not alter the source code of a web page at all in order to alter a form included in the web page.

Figure 2:
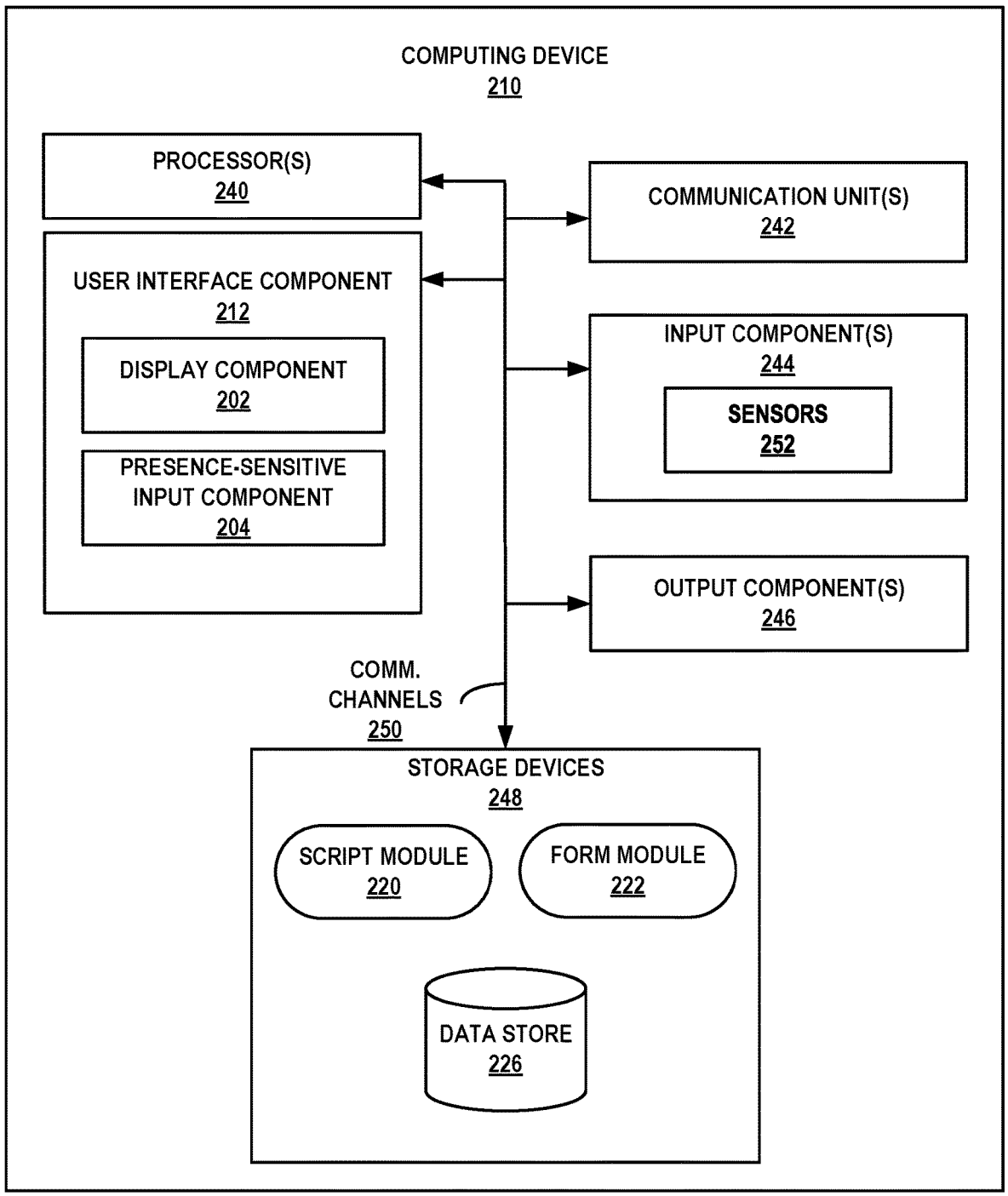
FIG. 2 is a block diagram illustrating a more detailed example of a computing device configured to perform the techniques described herein.

FIG. 2 is a block diagram illustrating an example computing device configured to produce a form object in a web page with limited source code in the web page for creation of the form, in accordance with one or more aspects of the techniques described in this disclosure. Computing device 210 of FIG. 2 is described below as an example of computing device 110 of FIG. 1. FIG. 2 illustrates only one particular example of computing device 210, and many other examples of computing device 210 may be used in other instances and may include a subset of the components included in example computing device 210 or may include additional components not shown in FIG. 2.

Computing device 210 may be any computer with the processing power required to adequately execute the techniques described herein. For instance, computing device 210 may be any one or more of a mobile computing device (e.g., a smartphone, a tablet computer, a laptop computer, etc.), a desktop computer, a smarthome component (e.g., a computerized appliance, a home security system, a control panel for home components, a lighting system, a smart power outlet, etc.), a wearable computing device (e.g., a smart watch, computerized glasses, a heart monitor, a glucose monitor, smart headphones, etc.), a virtual reality/augmented reality/extended reality (VR/AR/XR) system, a video game or streaming system, a network modem, router, or server system, or any other computerized device that may be configured to perform the techniques described herein.

As shown in the example of FIG. 2, computing device 210 includes user interface component (UIC) 212, one or more processors 240, one or more communication units 242, one or more input components 244, one or more output components 246, and one or more storage components 248. UIC 212 includes display component 202 and presence-sensitive input component 204. Storage components 248 of computing device 210 include script module 220, form module 222, and notification data store 226.

One or more processors 240 may implement functionality and/or execute instructions associated with computing device 210 to dynamically create a form as part of a web page displayed on UIC 212 of computing device 210. That is, processors 240 may implement functionality and/or execute instructions associated with computing device 210 to dynamically transition an interface element associated with application 218 displayed on UIC 212 of computing device 210 between the different graphical interface modalities noted above.

Examples of processors 240 include application processors, display controllers, auxiliary processors, one or more sensor hubs, and any other hardware configure to function as a processor, a processing unit, or a processing device. Modules 220 and 222 may be operable by processors 240 to perform various actions, operations, or functions of computing device 210. For example, processors 240 of computing device 210 may retrieve and execute instructions stored by storage components 248 that cause processors 240 to perform the operations described with respect to modules 220 and 222. The instructions, when executed by processors 240, may cause computing device 210 to create a web page that includes limited source code for a form object output for display on UIC 212.

Script module 220 may execute locally (e.g., at processors 240) to provide functions associated with accessing a configuration file to assemble the necessary components for a form included in a web page that is separate from a typical form included in the HTML coding library. In some examples, script module 220 may act as an interface to a remote service accessible to computing device 210. For example, script module 220 of computing device 210 may be an interface or application programming interface (API) to a remote server that accesses a configuration file stored in data store 226 and create a form element in a web page based on the information in the configuration file.

In some examples, form module 222 may execute locally (e.g., at processors 240) to provide functions associated with displaying interface elements associated with the form (e.g., form 106 of FIG. 1). In some examples, form module 222 may act as an interface to a remote service accessible to computing device 210. For example, form module 222 may be an interface or application programming interface (API) to a remote server that receives the components for the form from script module 220 and generates the graphical elements to be output on computing device 210.

One or more storage components 248 within computing device 210 may store information for processing during operation of computing device 210 (e.g., computing device 210 may store data accessed by modules 220 and 222 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 222 and data store 226. Storage components 248 may include a memory configured to store data or other information associated with modules 220 and 222 and data store 226.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive input device (e.g., a touch sensitive screen, a PSD), mouse, keyboard, voice responsive system, camera, microphone or any other type of device for detecting input from a human or machine. In some examples, input components 244 may include one or more sensor components (e.g., sensors 252). Sensors 252 may include one or more biometric sensors (e.g., fingerprint sensors, retina scanners, vocal input sensors/microphones, facial recognition sensors, cameras) one or more location sensors (e.g., GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, or a step counter sensor.

One or more output components 246 of computing device 210 may generate output in a selected modality. Examples of modalities may include a tactile notification, audible notification, visual notification, machine generated voice notification, or other modalities. Output components 246 of computing device 210, in one example, includes a presence-sensitive display, a sound card, a video graphics adapter card, a speaker, a cathode ray tube (CRT) monitor, a liquid crystal display (LCD), a light emitting diode (LED) display, an organic LED (OLED) display, a virtual/augmented/extended reality (VR/AR/XR) system, a three-dimensional display, or any other type of device for generating output to a human or machine in a selected modality.

UIC 212 of computing device 210 includes display component 202 and presence-sensitive input component 204. Display component 202 may be a screen, such as any of the displays or systems described with respect to output components 246, at which information (e.g., a visual indication) is displayed by UIC 212 while presence-sensitive input component 204 may detect an object at and/or near display component 202.

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

UIC 212 of computing device 210 may detect two-dimensional and/or three-dimensional gestures as input from a user of computing device 210. For instance, a sensor of UIC 212 may detect a user's movement (e.g., moving a hand, an arm, a pen, a stylus, a tactile object, etc.) within a threshold distance of the sensor of UIC 212. UIC 212 may determine a two or three-dimensional vector representation of the movement and correlate the vector representation to a gesture input (e.g., a hand-wave, a pinch, a clap, a pen stroke, etc.) that has multiple dimensions. In other words, UIC 212 can detect a multi-dimension gesture without requiring the user to gesture at or near a screen or surface at which UIC 212 outputs information for display. Instead, UIC 212 can detect a multi-dimensional gesture performed at or near a sensor which may or may not be located near the screen or surface at which UIC 212 outputs information for display.

In accordance with the techniques described herein, a user or script module 220 (e.g., through a web page creation assistant) may include, within source code of a webpage, a script file in data store 226. The script file may include a sequence of code that creates a form object class that can be inserted into the source code of the webpage, as well as instructions for how to navigate a configuration file to create a form in a web page based on the values in the configuration file. In some instances, the script file may be a JavaScript file. The source code may be Hypertext Markup Language (HTML) source code.

The user or script module 220 may also create a first configuration file, stored in data store 226, that defines a first plurality of components of a first form. The first plurality of components include at least one input component and at least one submission component. In some instances, the configuration file may be a text file written in JavaScript Object Notation.

The configuration file may include values for each of the plurality of components and one or more of a name value, an id value, a version value, a type value, and an action value. For each of the at least one submission components, the value may be text to be displayed within a submission button on the graphical user interface. For the input components, the values may be one or more of a field name, a field input type (e.g., text, dropdown menu, checkbox, radio button, etc.), a field descriptor type, a field label, a field display size, a field validation, a field validation message, a field help message, one or more field input options, and field adaptive logic. The user or script module 220 may create the configuration file within one or more of a text editor or a web browser. In the instances where the user or script module 220 create the configuration file within the web browser, form module 222 may, as text is entered into a configuration file field within the web browser, outputting, for display on UIC 212, a preview image of a form generated using the text currently in the configuration file field. This may provide a live preview of what the web page would display should script module 220 cycle through the configuration file as currently constructed.

The user or script module 220 may instantiate, within the source code of the webpage, the form object class to create a first instance of the form object class. The first instance includes a reference to the first configuration file. In instantiating the form object class to create the first instance of the form object class, the user or script module 220 may do so within a single tag of the source code. This single tag may not include any subtags, or may include only a single variable defining the first configuration file in the single tag. In other words, rather than the user needing extensive knowledge in HTML or another web coding language to create each and every form element in the web coding language used for the source code, the user only needs to insert a single tag, with that single tag defining the configuration file. As the configuration file includes simpler, non-coding language, it may be simpler for a non-coding expert to create and maintain a form in a web page.

Script module 220 may execute the source code. In executing the source code, script module 220 may also execute the script file. Script module 220 may also execute the first instance of the form object class using the script file and the first configuration file. With the information extracted from the first configuration file using the script in the script file, form module 222 may generate a graphical user interface that includes at least a portion of the first plurality of components of the first form. Form module 222 may then output, for display on UIC 212, the graphical user interface, for instance, as part of a web page.

In some instances, the user or script module 220 may edit the first configuration file such that the first configuration file defines a second plurality of components of a second form. The second plurality of components including at least one input component and at least one submission component, but the second plurality of components may be different than the first plurality of components due to the editing. However, the user or script module 220 may refrain from editing the source code, making the same call to the first configuration file within the source code. Script module 220 may re-execute the source code by re-executing the script file and re-executing the first instance of the form object class using the script file and the first configuration file. With the information extracted from the first configuration file, form module 222 may generate a second graphical user interface that includes at least a portion of the second plurality of components of the second form. Form module 222 may then output, for display on UIC 212, the second graphical user interface. In this way, the user or script module 220 may be capable of changing the entire look or contents of the form displayed on the web page without altering the source code for the web page.

In some other instances, the user or script module 220 may create a second configuration file that defines a second plurality of components of a second form. The second plurality of components include at least one input component and at least one submission component, with the second plurality of components being different than the first plurality of components. In such instances, to change the form on the web page, the user or script module 220 may edit the source code only to change the instantiation of the first instance of the form object class to be a second instance of the form object class. The second instance may include a reference to the second configuration file. Script module 220 may re-execute the source code by re-executing the script file and re-executing the first instance of the form object class using the script file and the first configuration file. With the information extracted from the first configuration file, form module 222 may generate a second graphical user interface that includes at least a portion of the second plurality of components of the second form. Form module 222 may then output, for display on UIC 212, the second graphical user interface.

Figure 3:
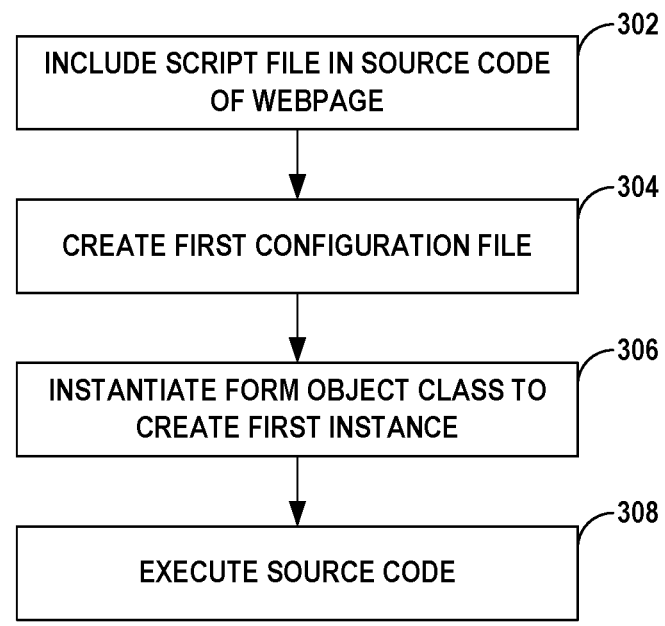
FIG. 3 is a flow diagram illustrating an example creation process for one or more forms in accordance with the techniques described herein.

FIG. 3 is a flow diagram illustrating an example creation process for one or more forms in accordance with the techniques described herein. The techniques of FIG. 3 may be performed by one or more processors of a computing device, such as computing device 110 of FIG. 1 and/or computing device 210 illustrated in FIG. 2. For purposes of illustration only, the techniques of FIG. 3 are described within the context of computing device 210 of FIG. 2, although computing devices having configurations different than that of computing device 210 may perform the techniques of FIG. 3.

In accordance with the techniques described herein, computing device 210 includes, within source code of a webpage, a script file (302). The script file creates a form object class that can be inserted into the source code of the webpage. Computing device 210 creates a first configuration file that defines a first plurality of components of a first form (304). The first plurality of components includes at least one input component and at least one submission component. Computing device 210 instantiates, within the source code of the webpage, the form object class to create a first instance of the form object class (306). The first instance includes a reference to the first configuration file. Computing device 210 executes the source code (308). To execute the source code, script module 220 executes the script file and executes the first instance of the form object class using the script file and the first configuration file to generate a graphical user interface that includes at least a portion of the first plurality of components of the first form. Form module 222 then outputs, for display on display component 202, the graphical user interface.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

What is claimed is:

1. A method comprising:
   including, within source code of a webpage, a script file, wherein the script file creates a form object class that can be inserted into the source code of the webpage;
   creating a first configuration file that defines a first plurality of components of a first form, the first plurality of components including at least one input component and at least one submission component;
   instantiating, within the source code of the webpage, the form object class to create a first instance of the form object class, wherein the first instance includes a reference to the first configuration file; and
   executing, using one or more processors, the source code, wherein executing the source code comprises:
      executing the script file;
      executing the first instance of the form object class using the script file and the first configuration file to generate a graphical user interface that includes at least a portion of the first plurality of components of the first form; and
      outputting, for display on a display device, the graphical user interface.

2. The method of claim 1, further comprising:
   editing the first configuration file such that the first configuration file defines a second plurality of components of a second form, the second plurality of components including at least one input component and at least one submission component, the second plurality of components being different than the first plurality of components; and
   refraining from editing the source code;
   re-executing, using the one or more processors, the source code, wherein re-executing the source code comprises:
      re-executing the script file;
      re-executing the first instance of the form object class using the script file and the first configuration file to generate a second graphical user interface that includes at least a portion of the second plurality of components of the second form; and
      outputting, for display on the display device, the second graphical user interface.

3. The method of claim 1, further comprising:
   creating a second configuration file that defines a second plurality of components of a second form, the second plurality of components including at least one input component and at least one submission component, the second plurality of components being different than the first plurality of components;
   editing the source code only to change the instantiation of the first instance of the form object class to be a second instance of the form object class, wherein the second instance includes a reference to the second configuration file; and
   re-executing, using the one or more processors, the source code, wherein re-executing the source code comprises:
      re-executing the script file;
      re-executing the first instance of the form object class using the script file and the first configuration file to generate a second graphical user interface that includes at least a portion of the second plurality of components of the second form; and
      outputting, for display on the display device, the second graphical user interface.

4. The method of claim 1, wherein the script file comprises a JavaScript file.

5. The method of claim 1, wherein the configuration file comprises a text file written in JavaScript Object Notation.

6. The method of claim 1, wherein the source code comprises Hypertext Markup Language source code.

7. The method of claim 1, wherein instantiating the form object class to create the first instance of the form object class comprises instantiating the form object class within a single tag of the source code.

8. The method of claim 7, wherein the single tag of the source code includes only a single variable defining the first configuration file.

9. The method of claim 1, wherein the configuration file comprises values for each of the plurality of components and one or more of:
   a name value,
   an id value,
   a version value,
   a type value, and
   an action value.

10. The method of claim 9, wherein the value for each of the at least one submission components comprises text to be displayed within a submission button on the graphical user interface.

11. The method of claim 9, wherein the values for each of the at least one input components comprise one or more of:
    a field name,
    a field input type,
    a field descriptor type,
    a field label,
    a field display size,
    a field validation,
    a field validation message,
    a field help message,
    one or more field input options, and
    field adaptive logic.

12. The method of claim 11, wherein the field input type comprises one or more of a text input type, a dropdown input type, a checkbox input type, and a radio button input type.

13. The method of claim 1, wherein the first configuration file is created within one or more of a text editor or a web browser.

14. The method of claim 13, wherein the first configuration file is created within the web browser, and wherein the method further comprises:
as text is entered into a configuration file field within the web browser, outputting, for display on the display device, a preview image of a form generated using the text currently in the configuration file field.

15. The method of claim 1, wherein outputting the graphical user interface for display comprises outputting, for display as part of a web page, the graphical user interface.

16. A computing device comprising:
one or more storage components configured to store source code of a webpage, wherein the source code of the webpage includes a script file, wherein the script file creates a form object class that can be inserted into the source code of the webpage; and
one or more processors configured to:
create a first configuration file that defines a first plurality of components of a first form, the first plurality of components including at least one input component and at least one submission component;
instantiate, within the source code of the webpage, the form object class to create a first instance of the form object class, wherein the first instance includes a reference to the first configuration file; and
execute the source code by:
executing the script file;
executing the first instance of the form object class using the script file and the first configuration file to generate a graphical user interface that includes at least a portion of the first plurality of components of the first form; and
outputting, for display on a display device, the graphical user interface.

17. The computing device of claim 16, wherein the one or more processors being configured to instantiate the form object class to create the first instance of the form object class comprises the one or more processors being configured to instantiate the form object class within a single tag of the source code.

18. The computing device of claim 17, wherein the single tag of the source code includes only a single variable defining the first configuration file.

19. The computing device of claim 16, wherein the one or more processors being configured to output the graphical user interface for display comprises the one or more processors being configured to output, for display as part of a web page, the graphical user interface.

20. A non-transitory computer-readable storage medium having stored thereon instructions that, when executed, cause one or more processors of a computing device to:
create a first configuration file that defines a first plurality of components of a first form, the first plurality of components including at least one input component and at least one submission component;
instantiate, within source code of a webpage, a form object class to create a first instance of the form object class, wherein the first instance includes a reference to the first configuration file, wherein the source code of the webpage includes a script file, wherein the script file creates the form object class that can be inserted into the source code of the webpage; and
execute the source code by:
executing the script file;
executing the first instance of the form object class using the script file and the first configuration file to generate a graphical user interface that includes at least a portion of the first plurality of components of the first form; and
outputting, for display on a display device, the graphical user interface.

* * * * *